April 27, 1926.
J. T. WELCH
FISH LURE
Filed Dec. 8, 1924
1,582,713
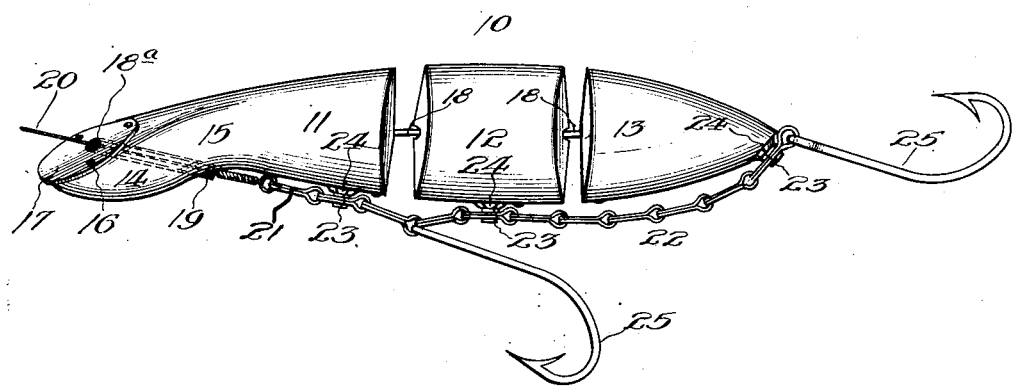
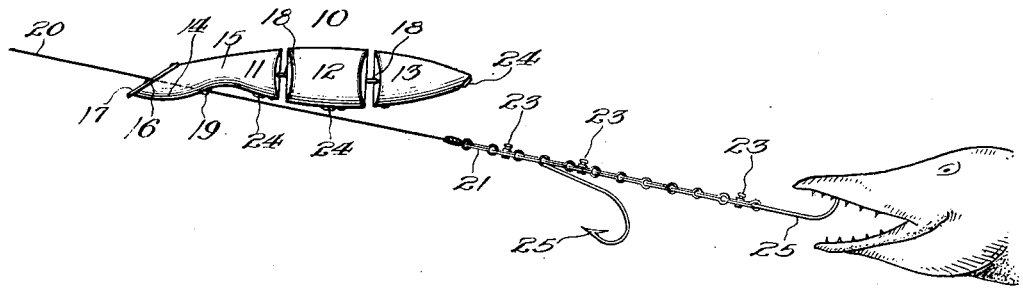
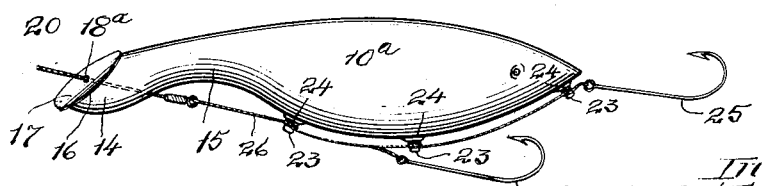
Inventor:
Jack T. Welch
by [signature]
Atty's Patented Apr. 27, 1926.

1,582,713

UNITED STATES PATENT OFFICE.

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN.

FISH LURE.

Application filed December 8, 1924. Serial No. 754,497.

*To all whom it may concern:*

Be it known that I, JACK T. WELCH, a citizen of the United States, residing at Dowagiac, in the county of Cass and State of Michigan, have invented certain new and useful Improvements in Fish Lures, of which the following is a specification.

This invention is intended primarily as a lure for large game fishes such as tarpon, muskallonge or the like, although adapted for smaller fish, and the primary object of the invention is to provide a lure to which the draft line carrying the hooks is removably secured, so that when the fish is hooked, the draft line will disengage from the lure body allowing the latter to slip up the line away from the hooks, where it will not interfere with the playing of the fish or afford the fish any assistance in its struggle to free itself from the hook. Furthermore, by providing a line of draft which is independent of the lure body, it will not be necessary to afford to the latter any great degree of tensile strength thereby permitting the use of bait bodies or lures which would not otherwise be capable of withstanding the strain imposed by the struggles of a large game fish, and at the same time the present invention permits the draft line, in proximity to the hooks, to be made of chain or cable which will resist biting or fraying from the teeth of the fish.

Other objects and characteristics of the invention will appear from the detailed description thereof and by reference to the accompanying drawings wherein—

Figure 1 is a perspective view of the lure of the present invention as used in trolling for large game fish;

Fig. 2 is a side elevation showing the position assumed by the tackle when a fish is hooked; and Fig. 3 is a perspective view of a slightly modified form of bait.

The present invention is applicable to bait or lure bodies of various types and of various configuration, but it is peculiarly adapted for use in connection with wooden bait or lure bodies so configured as to produce a darting, diving or wiggling motion when drawn through the water, and for purposes of illustration, and as an exemplification of the present invention, a bait body has been shown of a type which has proved peculiarly effective in luring game fish.

As shown in Fig. 1, the body 10 consists of a forward section 11, a middle section 12 and a tail section 13. The forward section is provided with a head 14 connected to the forward section by a neck 15 of reduced dimensions, and the front face 16 of the head is extended downwardly and forwardly and capped by the provision of a flat obliquely disposed plate 17 which affords a plain surface against which the water impinges in such a way as to cause a diving or darting action when in use.

The sections 11, 12 and 13 are hinged together by means of links 18 to give to the body an articulated formation which materially assists in simulating the actions of a live minnow.

The head 14 and plate 17 have drilled therethrough a straight bore 18ª which terminates at its rear end at a point immediately beneath the neck 15, and this bore is preferably walled by a metal tube 19 to prevent fraying or wearing of the wood by the passage of the fish line 20 which is preferably of woven wire where large game fish are being sought, although the line may obviously be of silk, linen or the like.

The bore 18ª extends in a direction but slightly out of co-incidence with the longitudinal axis of the bait or lure body, and in such direction as to merge easily and smoothly into the general line of curvature of the lower side of the bait or lure body, the rear end of the fish line being secured to the forward link 21 of a chain 22 which is of sufficient length to extend from the neck 15 to the rear tip end of the bait or lure body to which it is secured by a plurality of snap heads 23 which engage with snap sockets 24 of the type commonly employed as glove fasteners.

As shown, three of these snap fasteners are provided, one on each section of the bait body, the arrangement being such that the chain 22 will be held in fairly close contact with the under surface of the bait body but in removable relation thereto, so that any substantial degree of strain imposed upon the line will have the effect of disengaging the snap connections and permitting the bait body to ride freely upon the line, as indicated in Fig. 2. The links of the chain 22 provide points of connection for one or more hooks 25, two being shown in the present instance, the leading hook being turned downwardly, and the trailing hook being turned upwardly, although other hook arrangements may be employed. If desired also an unjointed body 10a and a plain wire leader 26 may be used as in Fig. 3.

In use, the hook chain will be snapped into the body of the lure, as in Fig. 1, after which the lure is in condition for trolling or casting, as the case may be, although the present lure is intended primarily for trolling. As the lure is drawn through the water it will tend to dive and dart from side to side by reason of the impingement of the water on the beveled or sloping face of the head, and by reason of the configuration of the head and neck which causes a darting and diving movement, the liveliness of which will be accentuated by the jointed character of the body. The body movements will be in no way impeded by the snap attachment of the chain, sufficient slack being afforded to permit freedom of movement.

As soon as a fish strikes, the setting of the hook will impose a sufficient strain or jerk to disengage the snap fasteners and the ensuing struggle of the fish will completely disengage the hook tackle from the lure body, so that no opportunity will be afforded to the fish to embed its teeth in the body in an effort to free itself from the hook, which circumstance not only assists in retaining the fish, but also relieves the body in large measure from danger of injury. At the same time by relieving the body from the strain of the fish and by securing the hooks directly to the draft line, adequate tensile strength will be afforded to resist the struggle of the largest fish.

In case one or more of the snap fasteners should become accidentally disengaged while trolling, this will not materially impair the effectiveness of the bait, since the hook chain and hooks will trail in very close proximity to the bait or lure body, so that a fish in lunging for the latter will in a large proportion of cases be caught by one of the hooks.

The invention is one which permits of the use of wooden baits in the luring of very large game fish without sacrifice in the elements of strength and durability which are essentional in tackle designed for this purpose.

In the drawings I have shown the leader in the form of a chain, but it is obvious that other types of leader may be used, or that the terminal section of the line itself may serve the functions of a leader as an attachment for the hooks in cases where a leader of special character is not required, so that in those claims where reference is made to securing the hook to the line, it will be understood that the claims are intended to cover such an attachment with or without the interposition of a specially designed leader.

I claim:

1. In a fish lure, the combination of a line terminating at its rear end in a chain section, a hook secured to the rear end of the chain section, a hook secured to an intermediate portion of the chain section, a bait body provided with an aperture through which the line in advance of the chain section is entered, and a frangible connection between the chain section and the body for temporarily holding the hooks in proximity to the body, substantially as described.

2. In a fish lure, the combination of a line terminating at its rear end in a chain section, a hook secured to the rear end of the chain section, a hook secured to an intermediate portion of the chain section, a bait body provided with an aperture through which the line in advance of the chain section is entered, and a snap lock connection between the chain section and the body in advance of the rear hook for temporarily holding the hooks in proximity to the body, substantially as described.

3. In a fish lure, the combination of a line terminating at its rear end in a leader, a hook secured to the leader, a bait body terminating at its forward end in a head having an obliquely disposed forward face, the head having a bore extending through the forward face and terminating behind and below the head through which bore the line in advance of the leader is slidably entered, and a frangible connection between the leader and the body for temporarily holding the hook in proximity to the body, substantially as described.

4. In a fish lure, the combination of a line terminating at its rear end in a chain section, a rear hook secured to the rear link of the chain section, and a forward hook secured to an advance link in the chain section, a bait body of cigar shape terminating at its forward end in an obliquely downwardly projecting head having an oblique forward face, the head being provided with a bore extending below and behind the head, the line in advance of the chain section being slidably entered through said bore, and snap connections one adjacent to each of the hooks for temporarily holding the hooks in proximity to the body, substantially as described.

5. In a fish lure, the combination of a line terminating at its rear end in a chain section, a rear hook secured to a rear link of the chain section, a forward hook secured to an advance link of the chain section, snap lock members on the links of the chain sections in proximity to the respective hooks, a bait body of cigar shape consisting of front, intermediate and rear sections flexibly linked together, the front section terminating at its forward end in an obliquely downwardly extending head having an oblique front face, the head having a bore formed therethrough, said bore extending through the oblique face and terminating below and behind the head and having the line in advance of the chain section slidably entered therethrough, and complementary snap lock members on the body sections for engaging with the snap lock members on the chain section for holding the hooks temporarily in close proximity to the body, the chain section lying in slack relation to the body to permit relative movement of the body sections, substantially as described.

6. In a fish lure, the combination of a cigar shaped bait body provided at its forward end with an obliquely disposed downwardly extending relatively short head provided with an aperture extending from the forward face of the head to a point below the head, a line terminating in a leader section, the line being slidably entered through said aperture and the leader normally lying exposed below the body, a frangible connection between the rear end of the leader section and the rear end of the body, and a hook secured to the extreme rear end of the leader section behind the frangible connection and adapted to trail behind the body, substantially as described.

7. In a fish lure, the combination of a cigar shaped bait body provided at its forward end with an obliquely disposed downwardly extending relatively short head provided with an aperture extending from the forward face of the head to a point below the head, a line terminating in a leader section, the line being slidably entered through said aperture and the leader normally lying exposed below the body, a frangible connection between the rear end of the leader section and the rear end of the body, a hook secured to the extreme rear end of the leader section behind the frangible connection and adapted to trail behind the body, and a forward hook secured to the leader section in advance of the frangible connection and adapted normally to occupy a position below the center portion of the body, substantially as described.

8. In a fish lure, the combination of a line terminating at its rear end in a chain section, a hook secured to the end of the chain section, a body provided at its forward end with an aperture through which the line in advance of the chain section is slidably entered, the line in advance of such aperture being unobstructed to permit forward sliding of the body, and a frangible connection between the rear end of the chain and the rear end of the body for holding the hook temporarily in promixity to the body, the chain between the front and rear ends of the body lying exposed below the body, substantially as described.

9. In a fish lure, the combination of a line terminating at its rear end in a chain section, a hook secured to the rear end of the chain section, a body provided at its forward end with an aperture through which the line in advance of the chain section is slidably entered, the line in advance of such aperture being unobstructed to permit forward sliding of the body, and a snap lock connection between the rear end of the chain and the rear end of the body for holding the hook temporarily in proxmity to the body, the chain between the front and rear ends of the body lying exposed below the body, substantially as described.

10. In a fish lure, the combination of a line terminating at its rear end in a leader section, a hook secured to the rear end of the leader section, a bait body provided at its forward end with an aperture through which the line is slidably entered in advance of the leader, the line in advance of such aperture being unobstructed to permit forward sliding of the body, and a frangible connection between the leader and the body in advance of the hook for holding the hook temporarily in proximity to the body and in freely swinging relation thereto, substantially as described.

11. In a fish lure, the combination of a line terminating at its rear end in a leader section, a hook secured to the rear end of the leader section, a bait body provided at its forward end with an aperture through which the line is slidably entered in advance of the leader, and a snap lock connection in advance of the hook between the leader and the body for holding the hook temporarily in proximity to the rear end of the body and in freely swinging relation thereto, substantially as described.

12. A fish lure comprising a line terminating at its rear end in a leader section, a hook secured to the rear end of the leader section, a bait body terminating at its forward end in a relatively short head connected to the body by a neck of reduced diameter, the head being provided with a bore extending therethrough, the line in advance of the leader being slidably entered through said bore and emerging below the rear end of the neck, the line in advance of said bore being unobstructed to permit forward sliding of the body, and a frangible connection in advance of the hook between the leader and the body and adapted to be broken by a downward and rearward pull on the hook, substantially as described.

JACK T. WELCH.